(12) United States Patent
Brendel et al.

(10) Patent No.: US 6,318,100 B1
(45) Date of Patent: Nov. 20, 2001

(54) INTEGRATED ELECTRONIC REFRIGERANT MANAGEMENT SYSTEM

(75) Inventors: Thomas Edward Brendel, Cape Coral, FL (US); John Robert Reason, Liverpool, NY (US); Douglas Herbert Morse, Millis, MA (US); L. Thomas Lane, Manlius, NY (US); Mead Robert Rusert, Athens, GA (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/549,867

(22) Filed: Apr. 14, 2000

(51) Int. Cl.$^7$ ................................................ F25B 41/04
(52) U.S. Cl. .................................................... 62/217
(58) Field of Search ............................ 62/217, 216, 196, 62/278

(56) References Cited

U.S. PATENT DOCUMENTS

| | | |
|---|---|---|
| 3,088,291 * | 5/1963 | Long ........................................ 62/192 |
| 3,214,931 | 11/1965 | Petranek . |
| 3,220,211 | 11/1965 | Norquest . |
| 3,665,725 * | 5/1972 | Barlass et al. ....................... 62/196.4 |
| 4,134,272 | 1/1979 | Reimann . |
| 4,240,263 * | 12/1980 | Brendel .................................... 62/115 |
| 4,295,344 * | 10/1981 | Hannett et al. ....................... 62/324.5 |
| 4,319,459 * | 3/1982 | Hannett et al. ........................... 62/77 |
| 4,335,580 * | 6/1982 | Hannett et al. ........................... 62/79 |
| 4,685,309 | 8/1987 | Behr . |
| 4,735,055 | 4/1988 | Taylor et al. . |
| 4,745,767 | 5/1988 | Ohya et al. . |
| 4,903,495 | 2/1990 | Howland et al. . |
| 5,016,447 * | 5/1991 | Lane et al. ............................... 62/470 |
| 5,067,556 | 11/1991 | Fudono et al. . |
| 5,131,237 | 7/1992 | Valbjorn . |
| 5,182,920 | 2/1993 | Matsuoka et al. . |
| 5,187,944 | 2/1993 | Jarosch . |
| 5,193,353 * | 3/1993 | Brendel et al. ....................... 62/196.4 |
| 5,197,297 * | 3/1993 | Brendel et al. ............................ 62/81 |
| 5,199,274 | 4/1993 | Yoshida et al. . |
| 5,291,745 | 3/1994 | Hanson . |
| 5,463,876 | 11/1995 | Bessler et al. . |
| 5,546,756 | 8/1996 | Ali . |
| 5,557,938 | 9/1996 | Hanson et al. . |
| 5,572,879 | 11/1996 | Harrington et al. . |
| 5,598,718 | 2/1997 | Freund et al. . |
| 5,625,276 | 4/1997 | Scott et al. . |
| 5,626,027 | 5/1997 | Dormer et al. . |
| 5,628,205 | 5/1997 | Rockenfeller et al. . |
| 5,661,378 | 8/1997 | Hapeman . |
| 5,715,704 | 2/1998 | Cholkeri et al. . |
| 5,771,703 | 6/1998 | Rajendran . |
| 5,780,998 | 7/1998 | Scott et al. . |
| 5,798,577 | 8/1998 | Lesesky et al. . |
| 5,867,998 | 2/1999 | Guertin . |
| 5,907,957 | 6/1999 | Lee et al. . |
| 5,996,364 * | 12/1999 | Lifson et al. ........................ 62/196.1 |
| 6,044,651 * | 4/2000 | Reason et al. .......................... 62/161 |
| 6,112,534 * | 9/2000 | Taras et al. .............................. 62/217 |
| 6,148,628 * | 11/2000 | Reason et al. .......................... 62/223 |

* cited by examiner

Primary Examiner—Teresa Walberg
Assistant Examiner—Daniel Robinson
(74) Attorney, Agent, or Firm—Niro, Scavone, Haller & Niro

(57) ABSTRACT

A process and method for monitoring and selectively controlling the capacity and power demand within a transport unit is disclosed. Specifically, the present invention teaches the combined controls of an electronic suction modulation valve, and electronic expansion valve, and/or an electronic hot gas valve in communication with a microcontroller and a number of sensors in order to monitor and control power consumption and capacity, preferably without the use or presence of compressor unloaders, mechanical throttling devices, or other mechanical power control devices.

9 Claims, 7 Drawing Sheets

INTEGRATED ELECTRONIC REFRIGERANT MANAGEMENT SYSTEM

I. FIELD OF THE INVENTION

The field of the present invention relates to control systems for transport refrigeration systems. More specifically, the present invention is directed towards managing refrigerant in a transport refrigeration system with one or more electronic control valves, including the electronic expansion valve (EXV), the electronic hot gas valve (ESV), and/or the electronic suction modulation valve (EMV).

II. DESCRIPTION OF THE PRIOR ART

A transport refrigeration system used to control enclosed areas, such as the insulated box used on trucks, trailers, containers, or similar intermodal units, functions by absorbing heat from the enclosed area and releasing heat outside of the box into the environment. Current transport refrigeration systems use mechanical valves to control refrigerant flow, pressure and temperature based upon various desired operating modes. Such control valves offer only a crude control of these operating parameters, while requiring unnecessary complexity in the tubing needed to manage the refrigerant.

Transport refrigeration systems currently employ a variety of controls to manage the operating parameters of a transport refrigeration system. As can be shown by U.S. Pat. Nos. 5,626,027 and 5,577,390, both assigned to the assignee of the present invention, compressors can be operated in a multi-stage mode or in single stage modes depending upon operating temperature. Such references further discuss generally the use of suction modulation for capacity control. However, the inventors believe that currently available prior art commercial designs, including those sold by assignee, do not offer a simplified transport refrigeration system tubing utilizing an integrated electronic refrigerant control.

The applicants have found that, in order to optimize management of a transport refrigeration system while simplifying the tubing system used, it is desirable to improve capacity and control power demand by combining a number of control features, including: 1) controlling refrigerant flow rate (i.e., through superheat control) with an electronic expansion valve; 2) controlling superheat to closer tolerances than currently used in commercial transport systems; 3) using an electronic expansion valve and/or electronic suction modulation valve to limit flow rate in cooling operating mode; and 4) using an electronic hot gas valve to limit flow rate during heating and defrost mode. The present invention thus allows for the elimination of certain previously desirable hardware and/or control features, including the liquid solenoid valve, a high pressure compressor discharge valve, defrost termination switches, mechanical suction throttling devices, compressor unloaders, and accumulator tanks.

III. SUMMARY OF THE INVENTION

The control process and system of the present invention calls for the integrated electronic management of a transport refrigeration system using the combined controls of a electronic exchange valve (EXV), electronic hot gas valve (ESV) and electronic suction modulation valve (EMV). The use of such valves as called for in the present invention preferably calls for the elimination or change of certain hardware and the implementation of certain controller protocols, preferably through the use of a microprocessor controller.

Specifically, the present invention calls for replacing the mechanical expansion valve (TXV) of a transport refrigeration system with an EXV. The TXV equalizer line and temperature sensing bulb used on existing transport refrigeration units would likewise be replaced with an evaporator pressure transducer (EPT) and an evaporator temperature sensor (EVAP).

The present invention further calls for the elimination of a liquid solenoid valve (SV2) through the use of an EXV and/or EMV to control superheat and power demand. The use of the EMV for purposes of power control in the present invention might also allows for the elimination of compressor unloaders. The present invention also preferably replaces the compressor high pressure switch (HP2) with a discharge pressure transducer (DPT or CDP). The ESV similarly allows for elimination of certain existing transport refrigeration unit hardware, such as hot gas solenoids (SV3, SV4) or three way valves. Finally, the present invention calls for using certain existing sensors on transport refrigeration systems (including the ambient temperature sensor (AAT or ATS), return air sensor (RAS or RAT) supply air sensor (SAS), compressor discharge temperature sensor (CDT) and water temperature sensor (WTS)) in conjunction with the EXV, ESV and EMV in order to control power consumption, refrigerant control rate and temperature.

The control process and system of the present invention uses an evaporator coil temperature sensor (EVAP), an evaporator pressure transducer (EPT), a discharge pressure transducer (DPT or CDP), and an ambient temperature sensor (AAT or ATS). In a further alternative preferred embodiment, the present invention could further include additional sensors to such as an engine water temperature sensor (WTS) and/or a compressor discharge temperature sensor (CDT) to control the shutdown of the transport refrigeration unit.

In essence, the transport refrigeration unit microprocessor (MICRO) uses inputs from the sensors referenced above to control the EXV, ESV and EMV. Specifically, the MICRO reads the EVAP and EPT inputs and calculates or approximates the actual evaporator coil superheat level within the system. The MICRO then compares this calculated superheat level and compares it with a desired superheat level which is stored within memory. The MICRO then generates control signals to close or open the EXV based upon differences between the calculated and desired superheat settings. The various desired superheat levels, in turn, will be set or determined by the MICRO depending upon which mode the transport refrigeration unit is in.

In its "base" setting, the controller monitors and calculates the superheat so as to minimize the level of superheating (short of flood back of liquid refrigerant into the compressor) and thus maximizing the capacity of transport refrigeration system. During pull-down (i.e., the mode in which transport refrigeration units are trying to reduce the temperature of the conditioned space), power is limited. Thus, by controlling the discharge pressure through the adjustment of the EXV, the system can limit compressor discharge pressure such that the maximum power limit is not exceeded. Similarly, in an alternative control system using the EMV of the present invention can similarly control discharge pressure.

In another variant from the base setting, when the operation of the system has caused the temperature of the engine coolant to approach its safety limit, the controller will cause an additional superheat offset to be added to the base level. This system adjustment will effectively reduce the engine load and avoid a high coolant temperature shutdown.

In yet another variant from the base setting, the control features of the present invention (specifically, the use of superheat offset) can be used to optimize partial load operation. The use of such a superheat offset reduces capacity and, more importantly, reduces unit fuel consumption.

Also, the addition of the EMV and ESV allows better effective power control in all operating modes of the transport refrigeration unit. In heating mode, the EMV will modulate to control power in a manner similar to the EXV power control in cooling mode. In addition, the EMV allows for accurate power control in the cooling mode without reducing the evaporator coil temperature, thus allowing humidity control via the EMV rather than the compressor unloaders, thus eliminating the unloaders and similar power control devices.

One example of the EMV control in a preferred embodiment of the present invention occurs upon reaching the maximum allowable evaporator superheat. In such an instance, the EMV will further modulate the refrigerant flow rate instead of the EXV or unloaders, thus providing a more effective control.

Finally, the integrated electronic refrigeration management system of the present invention incorporates the modulating use of the ESV to minimize cooling or heating capacity during those times when other means of capacity reduction still leave the system with excess capacity. Preferably, in the present invention, the ESV will open slowly under the control of MICRO sensing such conditions as suction pressure and superheat leaving the evaporator. The ESV can further be used to control "top freezing" conditions which occur when the system operates at or near freezing temperature conditions. The ESV, in conjunction with the MICRO and SAS by prompting the ESV to bypass hot gas into the evaporator as required to reduce cooling capacity and maintain a product temperature just above freezing.

Accordingly, one object of the present invention is to provide a microprocessor control for the regulation of electronic hot gas valve, electronic expansion valve, and electronic suction modulation valve.

It is a further object of the invention to provide a microprocessor control for selectively activating and deactivating the expansion valve, the hot gas valve, and the suction modulation valve in order to maintain the compressor within its design operating envelope.

It is yet another object of the present invention to provide a controller for using the EMV, ESV, and EXV in combination to keep the compressor within its design envelope under any normal operating conditions while optimizing power control and capacity control.

These and other objects, features, and advantages of the present invention will become more apparent in light of the following detailed description of a best mode embodiment thereof, and as illustrated in the accompanying drawings.

IV. DETAILED DESCRIPTION OF THE INVENTION

The invention that is the subject of the present application is one of a series of applications dealing with transport refrigeration system design and control, the other copending applications including: "Electronic Hot Gas Valve"; "Electronic Expansion Valve Control System"; "Voltage Control Using Engine Speed"; "Economy Mode For Transport Refrigeration Units"; "Superheat Control for Optimum Capacity Under Power Limitation and Using a Suction Modulation Valve"; "High Engine Coolant Temperature Control"; "Generator Power Management"; and "Electronic Expansion Valve Control Without Pressure Sensor Reading," all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" Electrically Powered Trailer Refrigeration Unit With Integrally Mounted Diesel Driven Permanent Magnet Generator;" and "Transport Refrigeration Unit With Synchronous Generator Power System," each of which were invented by Robert Chopko, Kenneth Barrett, and James Wilson, and each of which were likewise assigned to the assignees of the present invention. The teachings and disclosures of these applications are likewise incorporated herein by reference.

Figure 1:
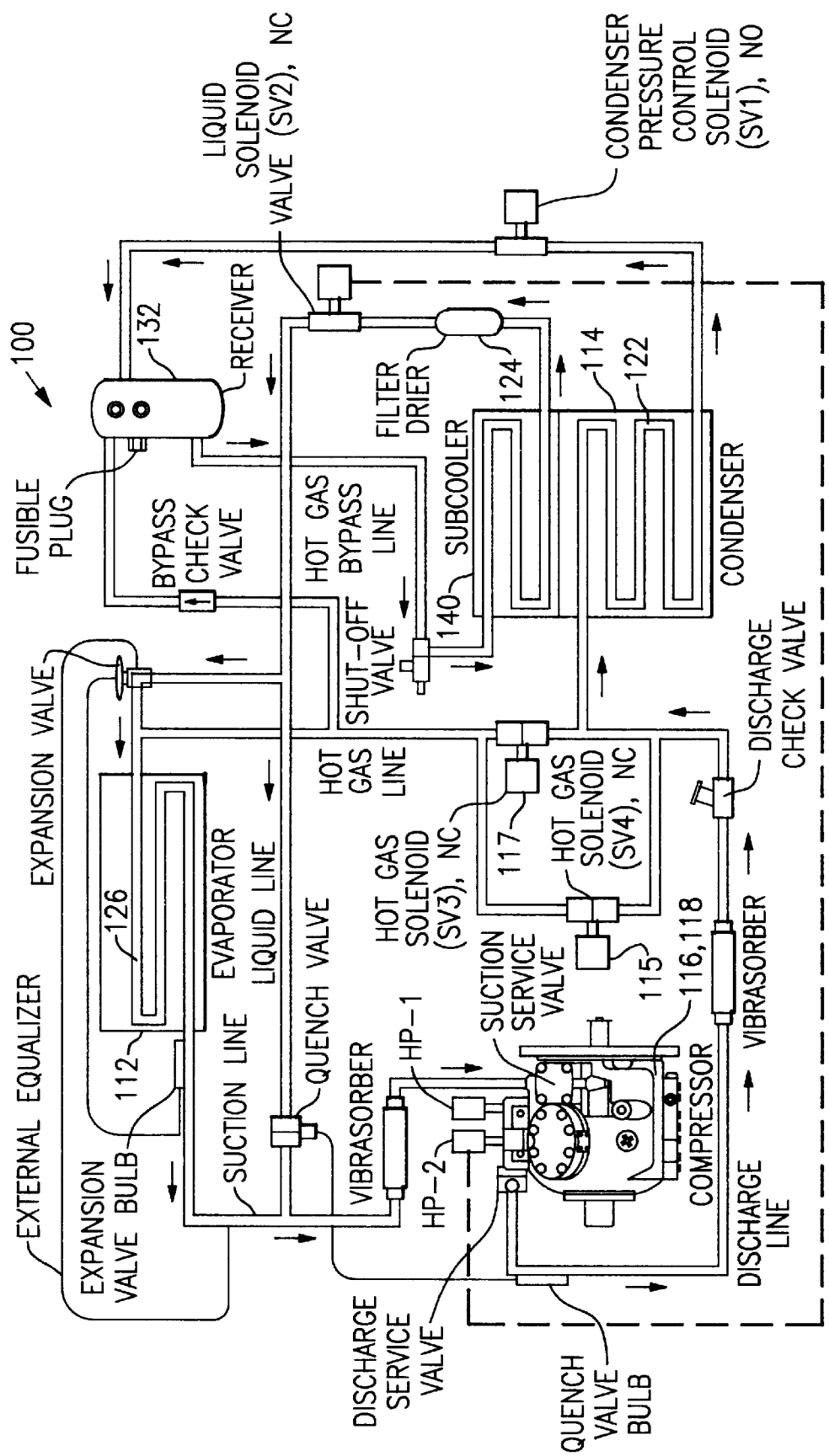
FIG. 1 shows a schematic of existing transport refrigeration systems in cooling mode.
Figure 3:
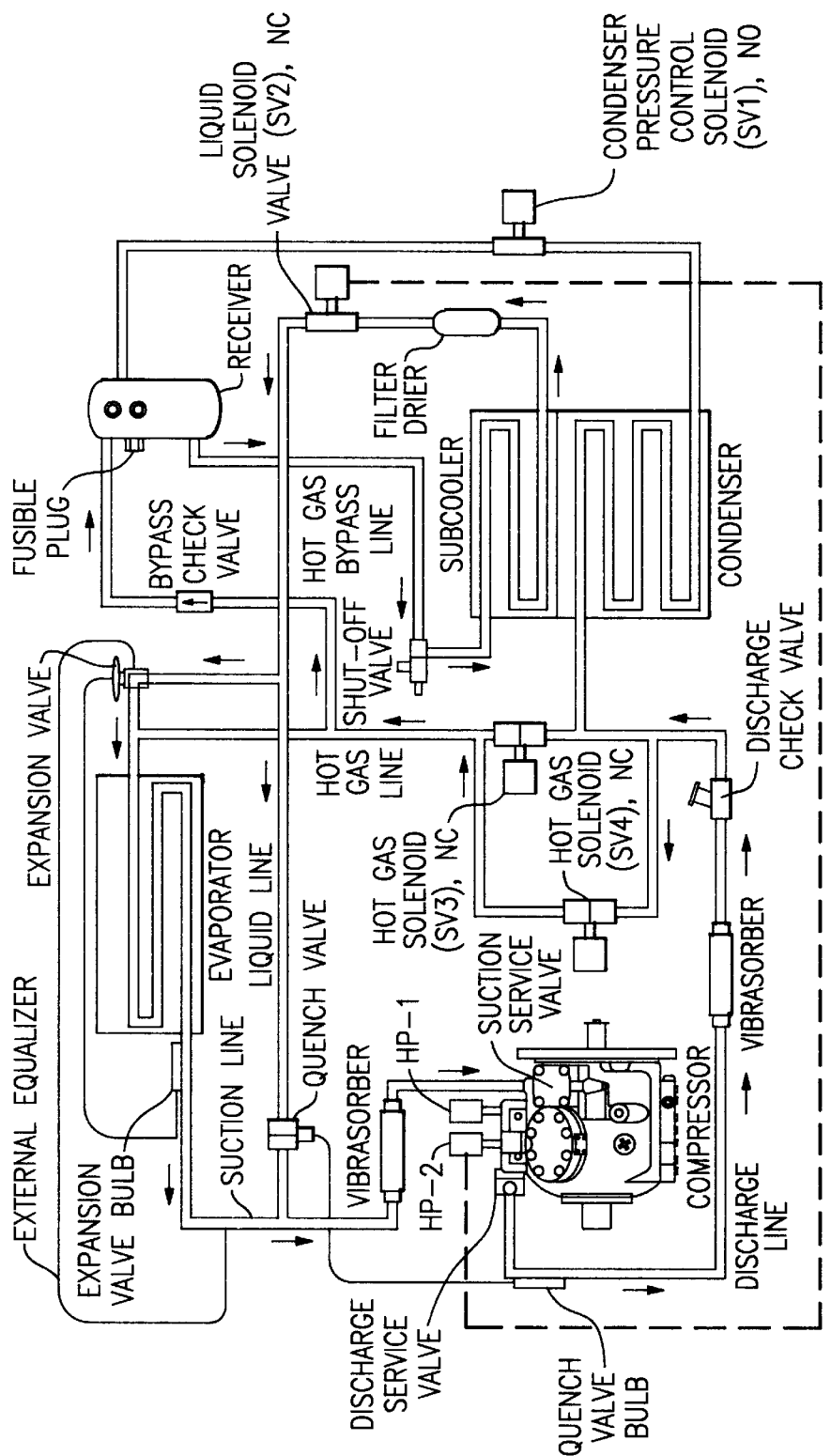
FIG. 3 shows a schematic of existing transport refrigeration systems in heating/defrost mode.

FIGS. 1 and 3 show schematic representations of example prior art transportation refrigeration systems. Such systems typically include a compressor 116, which is driven by a motor 118 to compress refrigerant. In the compressor, the (preferably vapor state) refrigerant is compressed to a higher temperature and pressure. The refrigerant then moves to the air-cooled condenser 114, which includes a plurality of condenser coil fins and tubes 122, which receives air, typically blown by a condenser fan (not shown). By removing latent heat through this step, the refrigerant condenses to a high pressure/high temperature liquid and flow to a receiver 132 that provides storage for excess liquid refrigerant during low temperature operation. From the receiver 132, the refrigerant flows through subcooler unit 140, then to a filter-drier 124 which keeps the refrigerant clean and dry, and then to a heat exchanger 142, which increases the refrigerant subcooling. Finally, the refrigerant flows through the evaporator 112 prior to reentry into the compressor 116. The flow rate of refrigerant through the evaporator 112 in such prior art would be modulated through a mechanical thermal expansion valve ("TXV") 111 responding to the feedback from the evaporator through an expansion valve bulb 113. The refrigerant flow is further controlled in such designs by a small hot gas valve (SV4) 115 and larger hot gas valve (SV3) 117, which work to prevent overload and minimize flood back.

Figure 2:
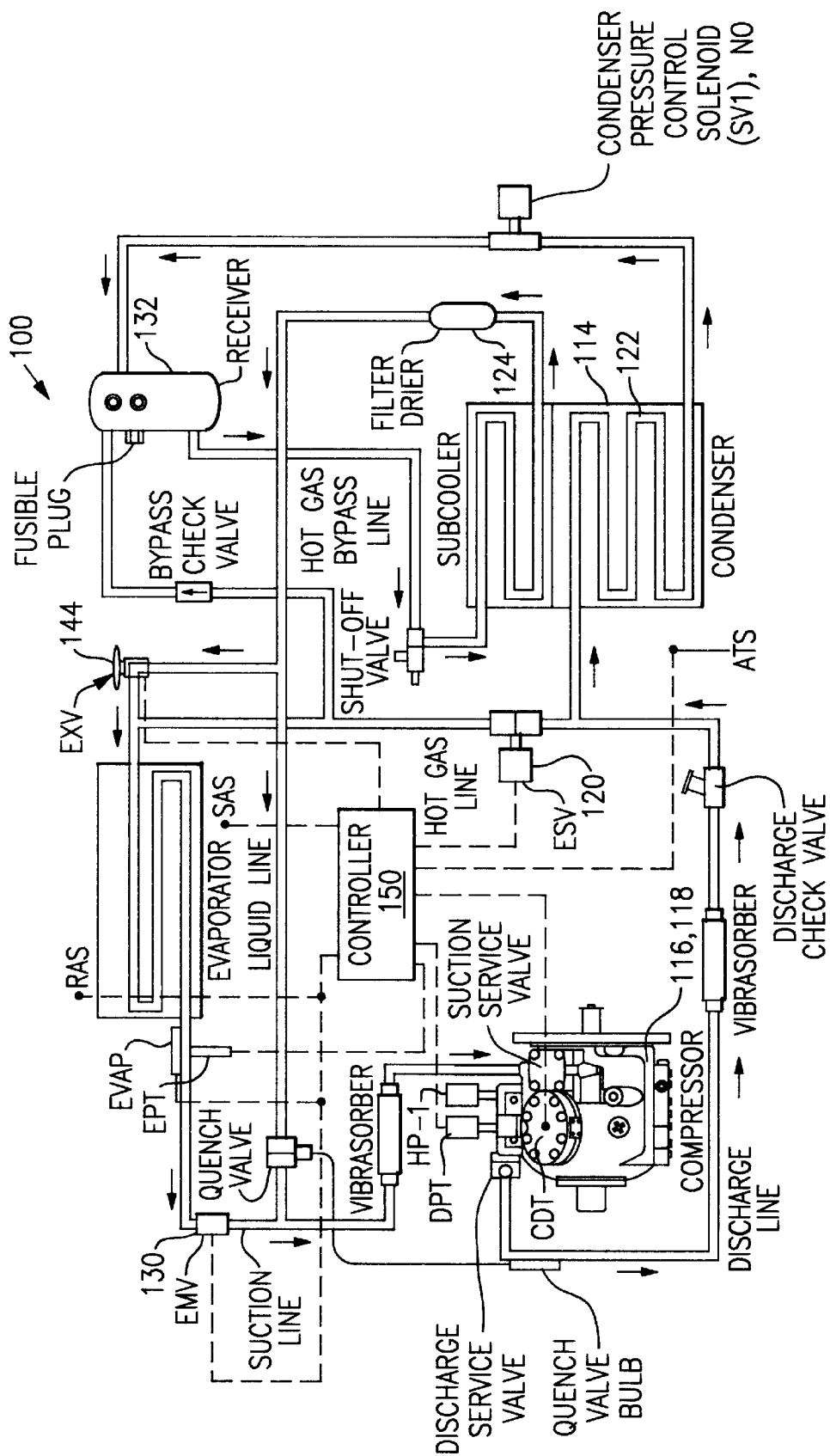
FIG. 2 shows a schematic of the transport refrigeration system of the present invention in cooling mode.
Figure 4:
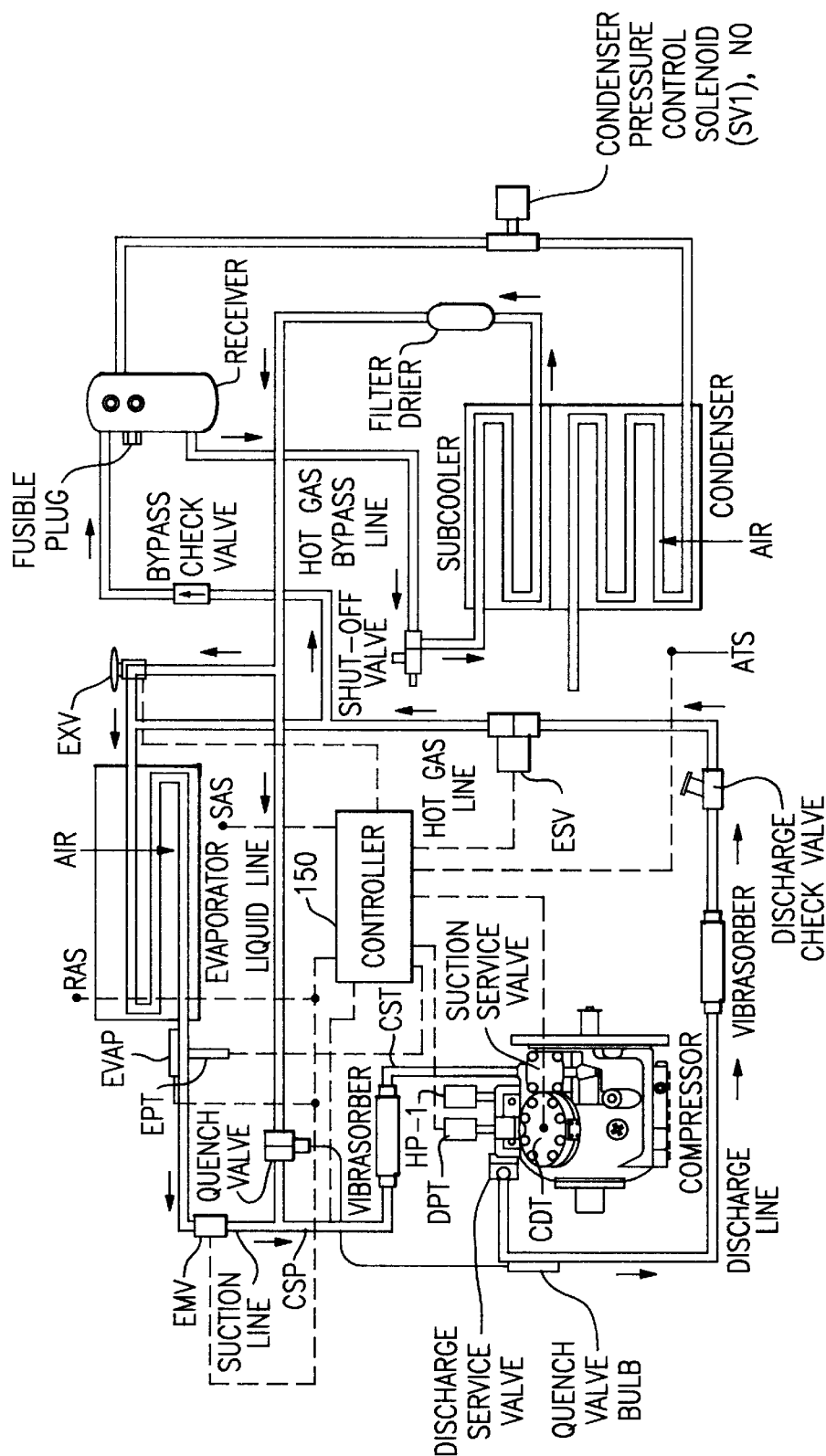
FIG. 4 shows a schematic of the transport refrigeration system of the present invention in heating/defrost mode.

FIGS. 2 and 4 illustrate schematic representations of the transport refrigeration system 100 of the present invention. The refrigerant (which, in its most preferred embodiment is R404A) is used to cool the box air (i.e., the air within the container or trailer or truck) of the refrigeration transport system 100. The motor 118 of the present invention is most preferably an integrated electric drive motor driven by a synchronous generator (not shown) operating at low speed (most preferably 45 Hz) or high speed (most preferably 65 Hz). A second preferred embodiment of the present invention, however, provides for motor 118 to be a diesel engine, most preferably a four cylinder, 2200cc displacement diesel engine which preferably operates at a high speed (about 1950 RPM) or at low speed (about 1350 RPM). The motor or engine 118 most preferably drives a 6 cylinder compressor 116 having a displacement of 600cc.

One of the improvements of the present invention includes the flow of refrigerant through an electronic expansion valve 144 (the "EXV") prior to passing through the evaporator 112. As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the evaporator 112 through an electronic suction modulation valve (or "EMV") back into the compressor.

Figure 5:
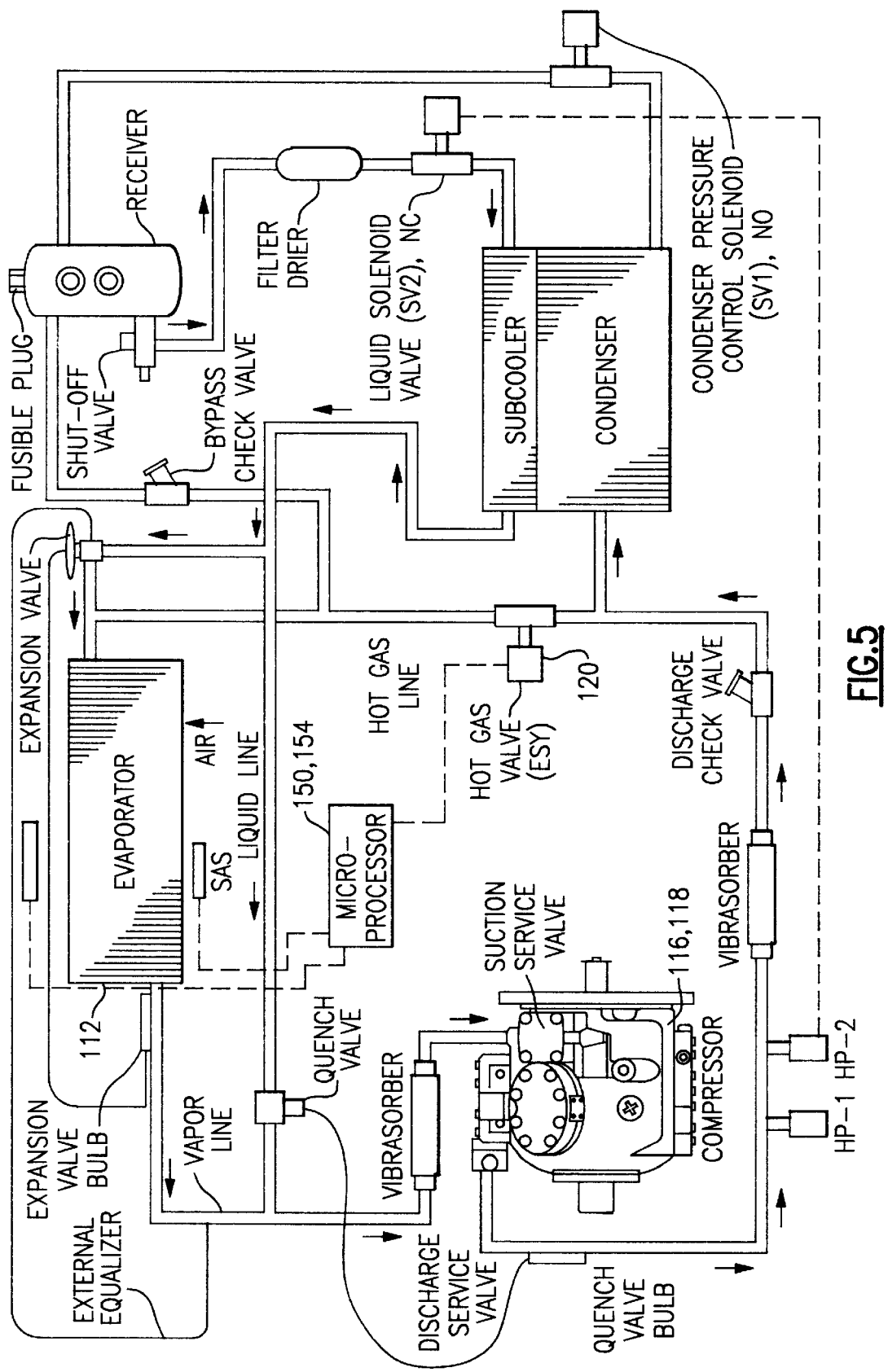
FIG. 5 shows a schematic of the electronic hot gas valve feature of the present invention in connection with the microprocessor.

An additional improvement for the intergrated electronic control system of the present invention is the use of an electronic hot gas valve ("ESV") 120 in place of the hot gas solenoid valves SV3 and SV4. The ESV 120 can be actuated to open slowly upon events such as suction pressure and unacceptable superheat levels leaving the evaporator 112 (similar to the controls used for EXV 144). The ESV 120 is also particularly useful for "top freezing" conditions, i.e., a phenomenon which occurs when the refrigeration system operates at or near freezing temperatures. The air leaving the coil of evaporator 112 under such conditions can, in fact, be well below freezing and can thus freeze the top portion of perishable loads unless potentially expensive and time consuming load insulation steps are taken. The ESV 120 of the present integrated control system accounts for this phenomenon by sensing through the supply air sensor (SAS) of evaporator 112 for when the return air temperature sinks below a predetermined limit. In such instances, as shown for instance in FIGS. 4 and 5, the SAS preferably signals a controller 150 to bypass hot gas directly to the evaporator 112, thus reducing cooling capacity and maintaining a product temperature above freezing.

Figure 6:
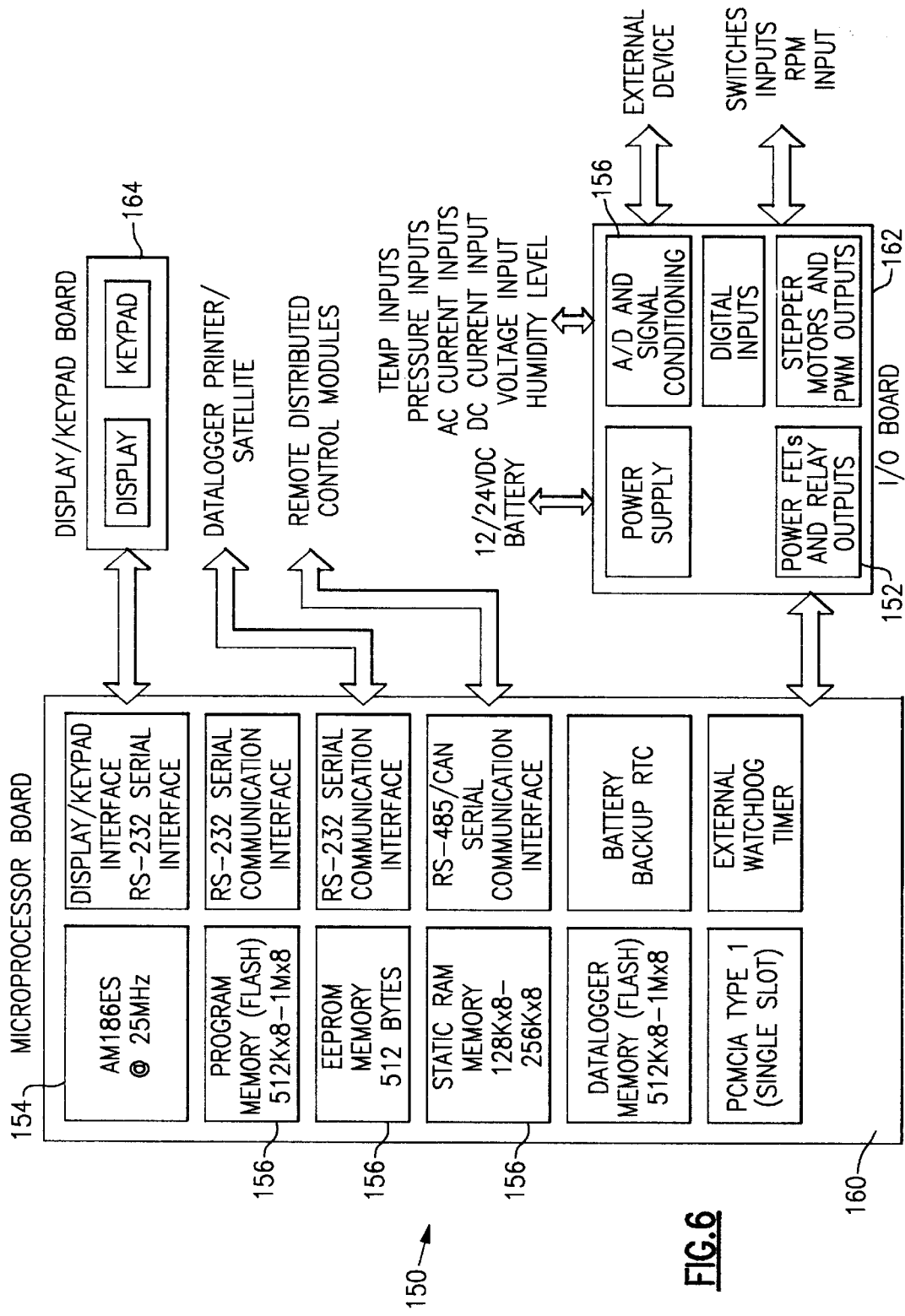
FIG. 6 shows a block schematic of a first preferred embodiment of a controller of the present invention.
Figure 7:
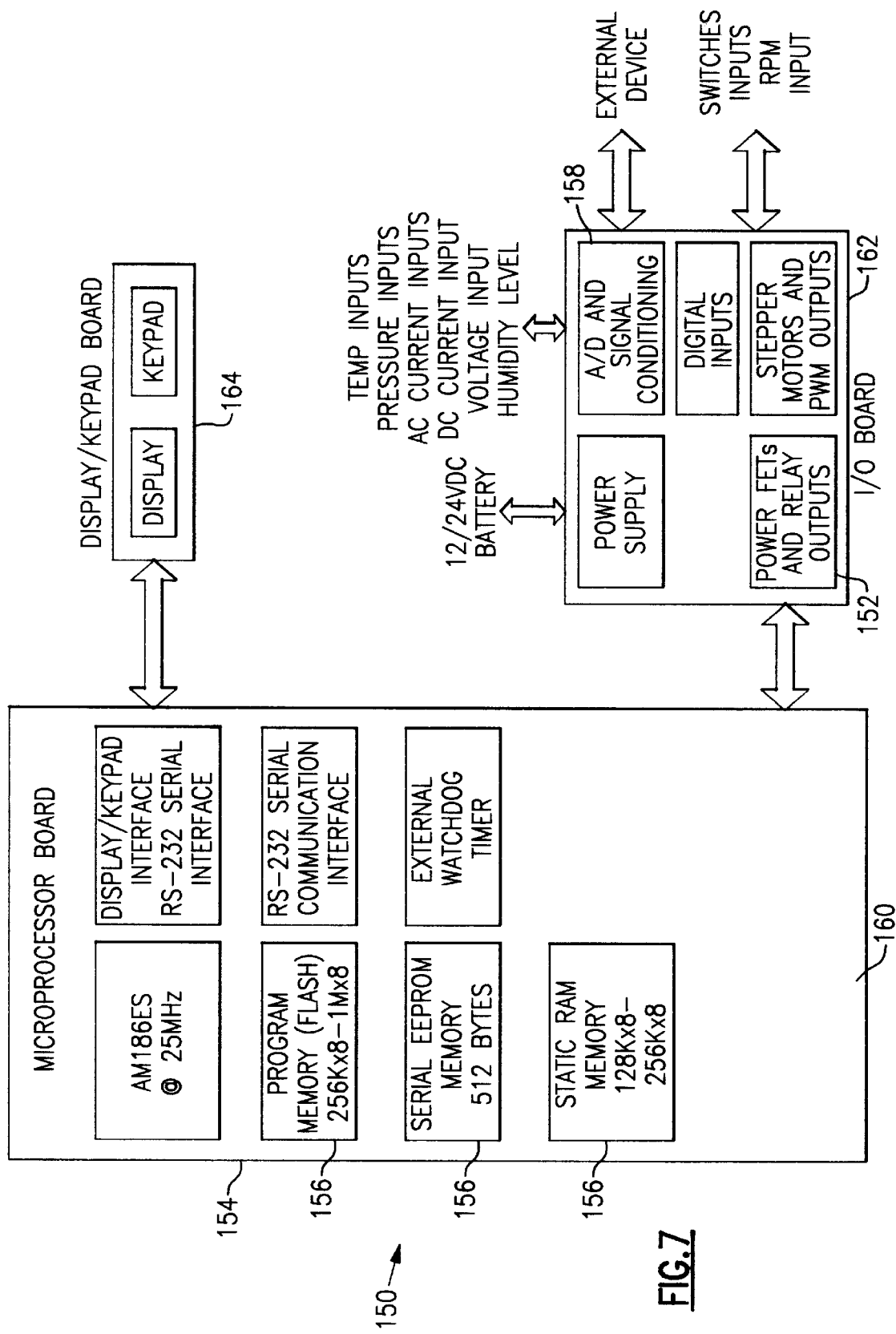
FIG. 7 shows a block schematic of a second preferred embodiment of a controller of the present invention.

Many of the points in the transport refrigeration system are monitored and controlled by a controller 150. As shown in FIGS. 6 and 7, controller 150 preferably includes a microprocessor 154 and its associated memory 156. The memory 156 of controller 150 can contain operator or owner preselected, desired values for various operating parameters within the system, including, but not limited to temperature set point for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 156 which receives temperature inputs and pressure inputs from various points in the system, AC current inputs, DC current inputs, voltage inputs and humidity level inputs. In addition, I/O board 162 includes drive circuits or field effect transistors ("FETs") and relays which receive signals or current from the controller 150 and in turn control various external or peripheral devices in the system 100, such as EMV 130, EXV 144 and the speed of engine 118 through a solenoid (not shown).

Among the specific sensors and transducers most preferably monitored by controller 150 includes: the return air temperature (RAS or RAT) sensor which inputs into the microprocessor 154 a variable resistor value according to the evaporator return air temperature; the ambient air temperature (ATS) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVAP) sensor, which inputs to microprocessor 154 a variable resistor value according to the outlet temperature of evaporator 112; the generator temperature (GENT) sensor, which inputs to microprocessor 154 a resistor value according to the generator temperature; the engine coolant temperature (ENCT) sensor, which inputs to microprocessor 154 a variable resistor value according to the engine coolant temperature of engine 118; the compressor suction pressure (CSP) transducer, which inputs to microprocessor 154 a variable voltage according to the compressor suction value of compressor 116; the compressor discharge pressure (CDP) transducer, which inputs to microprocessor 154 a variable voltage according to the compressor discharge value of compressor 116; the evaporator outlet pressure (EPT) transducer which inputs to microprocessor 154 a variable voltage according to the evaporator outlet pressure of evaporator 112; the engine oil pressure switch (ENOPS), which inputs to microprocessor 154 an engine oil pressure value from engine 118; direct current and alternating current sensors (CT1 and CT2, respectively), which input to microprocessor 154 a variable voltage values corresponding to the current drawn by the system 100 and an engine RPM (ENRPM) transducer, which inputs to microprocessor 154 a variable frequency according to the engine RPM of engine 118.

As discussed above, and as shown in FIG. 6 and 7, the present invention addresses the use of a controller 150 in a transport refrigeration system 100 to maintain within the operating conditions of compressor 116. The controller 150 of system 100 controls EMV 130 in combination with the EXV 144 and ESV 120 in order maintain precise control of compressor 116 within its design envelope under any normal operating conditions.

In the base implementation of the present invention, the microprocessor 154 uses inputs from EPT and EVAP in order to calculate the evaporator coil superheat, using algorithms understood by those of ordinary skill in the art. The microprocessor 154 then compares the calculated superheat value to a preselected, desired superheat value stored in memory 156. The microprocessor 154 will then actuate the EXV 144 depending upon differences between actual and desired superheat in order to maintain the desired superheat setting (i.e., preferably the minimum superheat so as to maximize unit capacity). Microprocessor 154 will most preferably be preselected to maintain the lowest setting of superheat which will maintain control and still not cause flood back (i.e., escape of liquid refrigerant into the compressor). This value will vary depending upon the capacity and specific configuration of the system, and can be determined through experimentation by those of ordinary skill in the art. This lowest level of superheat will then preferably be used as the "base" setting from which superheat offsets are made in the event of various operating and/or ambient conditions.

In one such condition (i.e., during pull-down mode) the controller 150 monitors and determines whether the required discharge pressure exceeds a predetermined power limit based upon ambient temperature. This limit is determined by an algorithm stored in memory 156 (the relationship between compressor discharge pressure, ambient air temperature and maximum available power varies depending upon system components, but can be readily determined by those of skill and programmed into microprocessor 154). If this limit is exceeded, the controller 150 can add an offset to the preselected superheat value stored in memory, which then causes the EXV 144 to close, thus causing a drop in refrigerant flow rate, a drop in compressor suction, and a drop in compressor discharge pressure. A feedback loop is preferably established between the CDP and EXV 144 to maintain the required compressor discharge limit.

Likewise, if the current draw value exceeds the preselected limit value, the microprocessor 154 implements an algorithm which increases the desired superheat level already stored in memory. As a result, microprocessor (through the drive circuit 162) issues a control signal which gradually closes the EXV 144 in order to achieve the desired superheat level. This closing of expansion valve 144 limits the mass flow rate of the refrigerant flowing through evaporator 112, and eventually results in a lower flow rate being handled by compressor 116, thus reducing the system power consumption.

In yet another condition requiring deviation from the base setting, the controller 150 selectively actuates the EMV 130 to control humidity within the conditioned space. If the superheat required to control the CDP is above the maximum allowable superheat levels (which can be programmed into memory), the EMV 130 is partially actuated. If, after a predetermined period of time (e.g., 20 seconds) the superheat values required to control the CDP value is still above the maximum allowable superheat value, the EMV 130 can be further actuated.

Still another variant from the base EXV/superheat setting could occur in the event of "top freezing" conditions. If the supply air sensor temperature dropped below a predetermined limit stored in memory (either by user selection or default preprogramming), the controller 150 would add an offset to the preselected superheat value stored in memory 156, thus causing the ESV 120 to bypass hot gas directly to the evaporator, thus resulting in a reduction of capacity and an increase in supply air temperature to above the predetermined limit. Likewise, this type of control could be used in an alternative embodiment to employ inputs from the RAT as well as SAS to maximize capacity (i.e., by adjusting the EXV 144 opening in order to maximize the differential between SAS and RAT), subject to override by the system limits and controls of the compressor discharge pressure DPT/CDP described above.

It will be appreciated by those skilled in the art that various changes, additions, omissions, and modifications can be made to the illustrated embodiments without departing from the spirit of the present invention. For instance, the values stored in memory could be stored in a map, or they could be calculated or stored in an algorithm used by processor 154 of controller 150. Likewise, the advantages of the present invention apply equally to non-reciprocating type compressors (e.g. screw compressors). All such modifications and changes are intended to be covered by the following claims.

We claim:

1. A process for improving the capacity of a transport refrigeration system, said process comprising the steps of:
   i monitoring evaporator outlet pressure and evaporator outlet temperature;
   ii comparing said evaporator outlet temperature and evaporator outlet pressure readings to a predetermined superheat limit stored in a controller memory; and
   iii selectively operating an electronic expansion valve in response to a evaporator outlet pressure and outlet temperature readings in excess of said predetermined limit.

2. A process for eliminating the occurrence of "top freezing" events within a transport refrigeration system, said process comprising the steps of:
   i sensing air temperature of air returning to an evaporator;
   ii comparing said return air temperature to a preselected limit; and
   iii selectively bypassing refrigerant around a condenser through an electronic hot gas valve to an evaporator, thus reducing the cooling capacity of the transport refrigeration system.

3. A process for controlling the power consumption of a transport refrigeration system in the absence of loading or unloading compressor cylinders, said process comprising the steps of:
   i monitoring discharge pressure of a compressor within the transport refrigeration system;
   ii comparing said compressor discharge pressure to a desired, preselected compressor discharge pressure limit; and
   iii selectively actuating an electronic suction modulation valve when said compressor discharge pressure exceeds said compressor discharge pressure limit, thereby restricting a refrigerant mass flow within the refrigeration system and to decreasing the compressor discharge pressure of said transport refrigeration system.

4. A process for optimizing capacity in a refrigeration unit under controlled, power limitation conditions, said process comprising the steps of:
   i monitoring discharge pressure of a compressor and ambient air temperature of the refrigeration unit;
   ii determining a desired compressor discharge pressure limit;
   iii comparing said compressor discharge pressure to said desired compressor discharge pressure limit; and
   iv selectively increasing a desired superheat setting when said compressor discharge pressure exceeds said compressor pressure discharge limit, thereby decreasing the a refrigerant mass flow within the refrigeration unit and decreasing power consumed by said refrigeration unit.

5. The process of claim 1 comprising the further steps of:
   v further monitoring the compressor discharge pressure of the refrigeration unit;
   vi comparing said compressor discharge pressure to said compressor discharge pressure limit; and
   vii selectively decreasing the desired superheat setting to its original value when said compressor discharge pressure falls below said compressor discharge pressure limit.

6. The process of claim 4, wherein said refrigeration unit is a transport refrigeration unit.

7. The process of claim 4, wherein the step of selectively increasing the desired superheat setting is limited by an algorithm in a controller, said algorithm being defined as a function of the compressor discharge temperature and the ambient air temperature.

8. The process of claim 4, wherein decreasing the mass flow of the refrigeration unit is accomplished by an electronic expansion valve.

9. The process of claim 8, comprising the further steps of comparing said increased desired superheat setting to a maximum superheat value, and actuating an electronic suction modulation valve to reduce mass flow of the refrigerant unit in the event said increased desired superheat setting exceeds said maximum superheat value.

* * * * *